(12) United States Patent
Maroschak et al.

(10) Patent No.: US 9,341,289 B1
(45) Date of Patent: May 17, 2016

(54) CORRUGATED DRAINAGE PIPE WITH PROTUBERANCES

(71) Applicant: PLASTIC TUBING INDUSTRIES, INC., Orlando, FL (US)

(72) Inventors: Michael Maroschak, Orlando, FL (US); Douglas Everson, Orlando, FL (US)

(73) Assignee: PLASTIC TUBING INDUSTRIES, INC., Orlando, FL (US)

( * ) Notice: Subject to any disclaimer, the term of this patent is extended or adjusted under 35 U.S.C. 154(b) by 114 days.

(21) Appl. No.: 14/208,851

(22) Filed: Mar. 13, 2014

Related U.S. Application Data

(60) Provisional application No. 61/787,213, filed on Mar. 15, 2013.

(51) Int. Cl.
| | |
|---|---|
| *F16L 11/11* | (2006.01) |
| *F16L 11/118* | (2006.01) |
| *B29C 43/22* | (2006.01) |
| *B29C 47/00* | (2006.01) |
| *B29D 23/18* | (2006.01) |

(52) U.S. Cl.
CPC ............. *F16L 11/118* (2013.01); *B29C 43/226* (2013.01); *B29C 47/004* (2013.01); *B29C 47/0023* (2013.01); *B29C 47/0066* (2013.01); *B29D 23/18* (2013.01)

(58) Field of Classification Search
CPC ........ F16L 37/248; F16L 11/11; F16L 11/118
USPC .............................. 138/121, 122, 173; 405/49
See application file for complete search history.

(56) References Cited

U.S. PATENT DOCUMENTS

| | | | |
|---|---|---|---|
| 3,578,777 A | * | 5/1971 | DeGain ................... F16L 11/15 138/121 |
| 3,747,352 A | | 7/1973 | Maroschak |
| 3,784,346 A | | 1/1974 | Maroschak |
| 3,789,615 A | | 2/1974 | Maroschak |
| 3,792,941 A | | 2/1974 | Maroschak |
| 3,799,418 A | | 3/1974 | Maroschak |
| 3,802,202 A | | 4/1974 | Maroschak |
| 3,825,288 A | | 7/1974 | Maroschak |

(Continued)

FOREIGN PATENT DOCUMENTS

| | | |
|---|---|---|
| GB | 2056285 | 8/1980 |
| JP | 61172720 A | 1/1985 |

(Continued)

OTHER PUBLICATIONS

American National Standard, Standard Specification for Steel Reinforced Polyethylene (PE) Corrugated Pipe, Designation: F2435-12, Jul. 1, 2012.

*Primary Examiner* — Patrick F Brinson
(74) *Attorney, Agent, or Firm* — Allen Dyer Doppelt Milbrath & Gilchrist

(57) ABSTRACT

A corrugated pipe includes an annular corrugated pipe body made of resilient material circumscribing a hollow conduit and including alternating annular ribs and annular valleys extending along a longitudinal axis thereof. At least one protuberance integral with the pipe body and having a protuberance sidewall extends radially outward from a modified annular rib to an apex positioned outwardly from the modified annular rib, the protuberance sidewall extends into the valleys immediately adjacent the modified annular rib.

5 Claims, 5 Drawing Sheets

(56) References Cited

U.S. PATENT DOCUMENTS

| | | | |
|---|---|---|---|
| 3,831,470 | A | 8/1974 | Maroschak |
| 3,832,855 | A | 9/1974 | Maroschak |
| 3,843,758 | A | 10/1974 | Maroschak |
| 3,854,527 | A | 12/1974 | Maroschak |
| 3,861,152 | A | 1/1975 | Maroschak |
| 3,861,153 | A | 1/1975 | Maroschak |
| 3,864,446 | A | 2/1975 | Maroschak |
| 3,870,774 | A | 3/1975 | Maroschak |
| 3,877,831 | A | 4/1975 | Maroschak |
| D235,100 | S | 5/1975 | Maroschak |
| D235,101 | S | 5/1975 | Maroschak |
| D235,102 | S | 5/1975 | Maroschak |
| D235,103 | S | 5/1975 | Maroschak |
| D235,104 | S | 5/1975 | Maroschak |
| 3,891,733 | A | 6/1975 | Maroschak |
| 3,897,090 | A | 7/1975 | Maroschak |
| 3,899,198 | A | 8/1975 | Maroschak |
| 3,904,228 | A | 9/1975 | Maroschak |
| 3,910,713 | A | 10/1975 | Maroschak |
| 3,916,763 | A | 11/1975 | Maroschak |
| 3,919,367 | A | 11/1975 | Maroschak |
| 3,941,639 | A | 3/1976 | Maroschak |
| 3,958,425 | A | 5/1976 | Maroschak |
| 3,986,963 | A | 10/1976 | Maroschak |
| 3,990,827 | A | 11/1976 | Maroschak |
| 4,003,685 | A | 1/1977 | Maroschak |
| 4,140,422 | A * | 2/1979 | Crumpler, Jr. ........ F16L 37/248 285/401 |
| 4,669,508 | A | 6/1987 | Neaves |
| 4,681,684 | A | 7/1987 | Maroschak et al. |
| 4,698,890 | A | 10/1987 | Neaves |
| 5,516,229 | A | 5/1996 | Atchley et al. |
| 5,520,481 | A | 5/1996 | Atchley et al. |
| 5,606,786 | A | 3/1997 | Presby |
| 5,706,864 | A * | 1/1998 | Pfleger ............... B32B 1/08 138/121 |
| 6,164,338 | A | 12/2000 | Holzer et al. |
| 6,461,078 | B1 | 10/2002 | Presby |
| 7,661,903 | B1 | 2/2010 | Maroschak |
| 7,717,138 | B2 | 5/2010 | Takagi |
| 7,891,382 | B2 | 2/2011 | Rushlander et al. |
| 8,096,236 | B2 * | 1/2012 | Fukami ............... B30B 15/047 100/231 |
| 2008/0245434 | A1 | 10/2008 | Hibino et al. |
| 2010/0037972 | A1 * | 2/2010 | Palmeri ............... F16L 11/118 138/121 |
| 2011/0139288 | A1 | 6/2011 | Rushlander et al. |
| 2011/0277866 | A1 | 11/2011 | Downing et al. |
| 2012/0240404 | A1 | 9/2012 | Hibino et al. |

FOREIGN PATENT DOCUMENTS

| | | |
|---|---|---|
| JP | 61172720 U | 4/1985 |
| JP | 2894044 B2 | 9/1991 |
| JP | 09253030 A | 3/1996 |
| JP | 2006083608 A | 9/2004 |
| JP | 2010166789 A | 1/2009 |

* cited by examiner

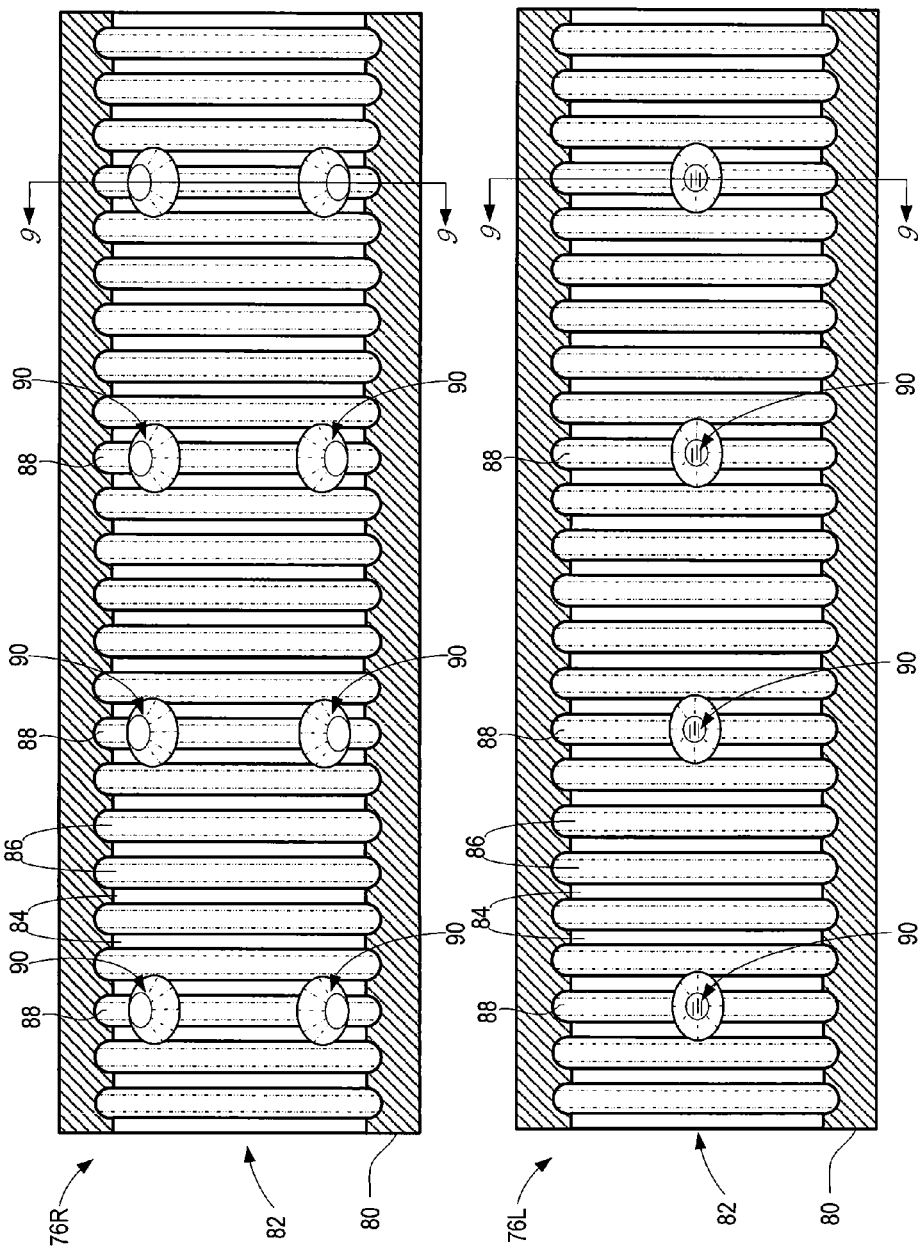

CORRUGATED DRAINAGE PIPE WITH PROTUBERANCES

CROSS-REFERENCE TO RELATED APPLICATION

This claims priority to U.S. provisional application Ser. No. 61/787,213, filed Mar. 15, 2013, which is incorporated by reference in its entirety.

FIELD OF THE INVENTION

The invention relates to the field of water management and, more particularly, to corrugated pipes used in water management systems.

BACKGROUND

Corrugated polyethylene pipe is a versatile product, in part, because it is relatively lightweight. This allows users to transport and install it more efficiently than comparable rigid plastic, metal, or concrete pipe. Corrugated polyethylene pipe is primarily used in gravity flow water management systems, examples of which include stormwater drainage, subsurface drainage, sewage, leachate collection, stormwater retention systems, transferring water from lakes and ponds, irrigation, agricultural drainage, and drainage from downspouts.

The lightweight construction of corrugated polyethylene pipes, however, presents a particular drawback. Because it is compressible, it may deform substantially when it is buried in areas that receive heavy vehicle or foot traffic, thereby reducing its effectiveness.

SUMMARY

We realized that this drawback is compounded when the corrugated pipe includes drainage holes through its body because the drainage holes make the pipe less stiff. What is needed to solve this problem is a corrugated drainage pipe having holes through the pipe body, but that still retains much of its stiffness. We also realized that it would be advantageous to form the pipe in such a way that the size of the holes can easily be customized for particular applications.

A corrugated pipe embodying these principles includes an annular corrugated pipe body made of resilient material, circumscribing a hollow conduit, and including alternating annular ribs and annular valleys extending along a longitudinal axis thereof. At least one protuberance integral with the pipe body and having a protuberance sidewall extends radially outward from a modified annular rib to an apex positioned outwardly from the modified annular rib. The protuberance sidewall extends into the valleys immediately adjacent the modified annular rib.

A method of forming openings in a body of a corrugated pipe includes introducing an extruded tube of resilient material into a molding apparatus having a plurality of cooperating mold members having a corrugated mold surface with protuberance forming depressions therein; contacting the extruded tube with the cooperating corrugated mold members to form a corrugated pipe having an annular corrugated pipe body circumscribing a hollow conduit and including alternating annular ribs and annular valleys extending along a longitudinal axis thereof, the corrugated pipe also having a plurality of protuberances, each protuberance having a protuberance sidewall extending radially outward from a modified annular rib to an apex positioned outwardly from the modified annular rib, the protuberance sidewall extending into the valleys immediately adjacent the modified annular rib; and forming openings in the pipe body by removing a radially distal end of the protuberances.

A corrugated-pipe-making system includes an extruder that extrudes resilient tubular material therefrom and a molding apparatus that receives the extruded tubular material. The molding apparatus has cooperating mold members having a corrugated mold surface with protuberance forming depressions therein. The cooperating mold members are configured to contact the extruded tubular material to form a corrugated pipe having an annular corrugated pipe body circumscribing a hollow conduit and including alternating annular ribs and annular valleys extending along a longitudinal axis thereof, the corrugated pipe also having a plurality of protuberances, each protuberance having a protuberance sidewall extending radially outward from a modified annular rib to an apex positioned over the modified annular rib. The system also includes a hole cutting apparatus including an annular blade that receives the corrugated pipe and cuts off a radially distal end of the protuberances as the corrugated pipe passes through the annular blade.

BRIEF DESCRIPTION OF THE DRAWINGS

FIG. 8 is front view of right and left mold members;

DETAILED DESCRIPTION OF EMBODIMENTS

In the Summary and in the Detailed Description of Embodiments, reference is made to particular features. Where a particular feature is disclosed in the context of a particular aspect or embodiment, that feature can also be used, to the extent possible, in combination with and/or in the context of other aspects and embodiments.

Under a given set of conditions, the efficiency of corrugated drainage pipe depends on three primary factors: (1) the size of the pipe, (2) the slope it is placed upon, and (3) the size of the holes or perforations through the pipe's body with relation to the surface contact area of the pipe. Typically the holes cut into the pipe body are the same size and repetitive throughout the length of the pipe. The result of this is that conventional corrugated pipes are manufactured with only a single hole size, even though the pipe is intended to address varying drainage conditions. Holes may be placed where they are not needed and may be too small where they are needed.

Our new corrugated pipe has improved stiffness over conventional corrugated pipe with holes through the pipe body and it also provides flexibility in tuning the size of the holes to a particular application. Each hole can be sized along the length of the pipe as it is being manufactured. Also, because we form the holes from the outside of the pipe, the material removed to form the holes does not fall into the pipe.

Figure 1:
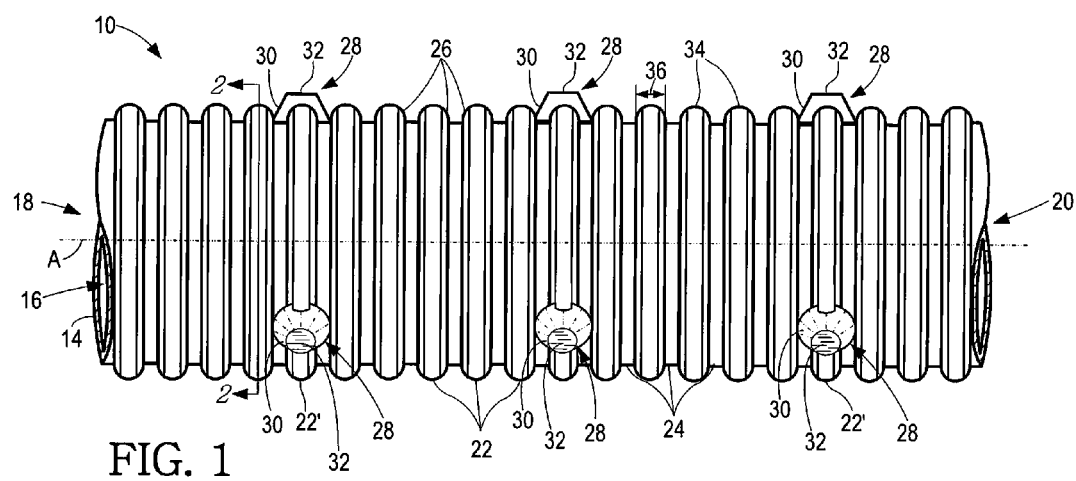
FIG. 1 is a side view of an exemplary corrugated pipe with protuberances.
Figure 2:
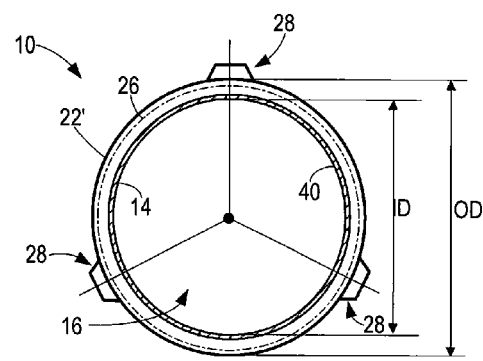
FIG. 2 is a front view of the pipe of FIG. 1.

Referring to FIGS. 1 and 2, the pipe 10 disclosed here includes a corrugated pipe body 14 circumscribing a hollow conduit 16 extending along a longitudinal axis A of the pipe 10 between a first end 18 and a second end 20 thereof. The pipe body 14 includes annular corrugations formed by alternating and successive ribs 22 and valleys 24 that are interconnected by rib side walls 26. The ribs 22 are wider than the valleys 24. The rib side 26 walls are tapered and lie in a plane slightly inclined from vertical.

The pipe body 14 is preferably made of moldable resilient material. Such moldable resilient material includes various moldable polymers, rubbers, or plastics, including, but not limited to, polyethylene, polystyrene, or styrene.

Some of the ribs 22 are modified to form modified ribs 22'. The modified ribs 22' include a protuberance 28 extending radially outward therefrom. Each protuberance 28 includes a substantially frustoconical protuberance sidewall 30 having an apex wall 32 located at a radially distal end thereof relative to the longitudinal axis A. The apex wall 32 is generally co-planar with the outer surface 34 of the ribs 22. Opposite the radially distal end, the base of the protuberances 28 extends into the two valleys 24 immediately adjacent the modified ribs 22'. The apex wall 32 is substantially circular and preferably has a diameter greater that the width 36 of the outer surface 34 of the ribs 22.

As shown in this embodiment, the protuberances 28 of each modified rib 22' are correspondingly arranged so that they are in longitudinal alignment with each other along the axis A. The location of the protuberances 28 relative to one another, however, need not be in this alignment for all embodiments. As best seen from FIG. 2, the pipe 10 includes an inside diameter ID and an outside diameter OD. The inside diameter ID is defined by the distance between diametrically opposing sides of the interior valleys 40. The outside diameter OD is defined by the distance between diametrically opposing sides of the ribs 22. The difference between the outside diameter OD and the inside diameter ID is the thickness of the pipe 10.

The protuberance sidewalls 30 are radially spaced along the modified ribs 22' about the axis A. In the embodiment shown, there are three protuberances 28 radially spaced along each modified rib 22' about an angle of 120 degrees. The embodiments, however, are not limited to this arrangement; instead, there may be any number of protuberances 28 radially spaced along the modified ribs 22' at any number of angles.

Figure 3:
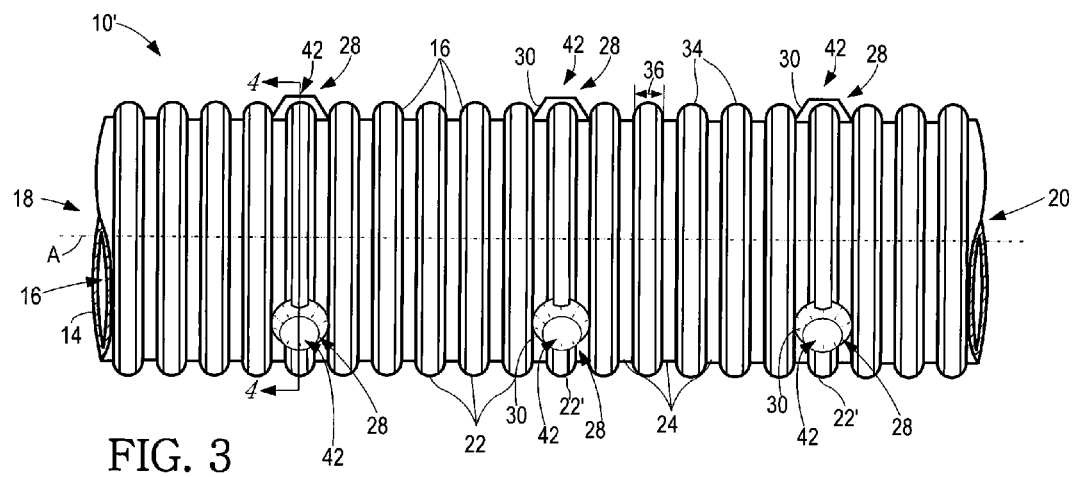
FIG. 3 is a side view of the pipe of FIG. 1 with the radially distal ends of the protuberances removed to form holes through the pipe body.
Figure 4:
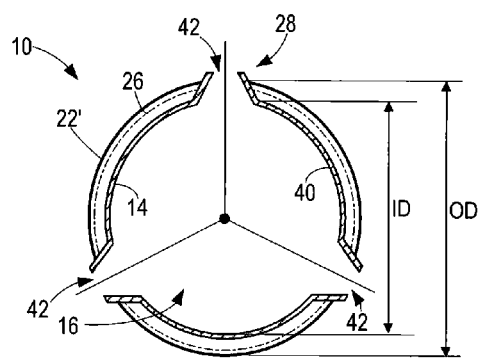
FIG. 4 is a front view of the pipe of FIG. 3.

Referring now to FIGS. 3 and 4, before using the pipes 10 it may be desirable to remove a radially distal portion of at least some of the protuberances 28 to form holes in the pipe body 14 along the axial direction of the pipe 10. FIGS. 3-4 show the pipe 10' with corresponding holes 42. The holes 42 allow liquid to drain from the pipe 10.

The holes 42 are preferably about ¼ inch in diameter to about ¾ inch in diameter. As illustrated, the holes 42 have a diameter greater than the width of the ribs 22. Because the protuberances 28 are substantially frustoconical, the diameter of the holes 42 is determined by the distance from the axis A at which the radially distal end of the protuberances 28 are removed.

The size of the pipe 10 may be adapted for its intended use, in particular, the volume of material the pipe is intended to handle. Accordingly, embodiments of the pipe 10 are not limited to any particular size. In some typical embodiments, however, the inner diameter is one of the standard diameters for corrugated polyethylene pipe. Suitable inner diameters ID include, but are not limited to, about 2 inches to about 12 inches.

Even though the holes 42 are formed though the pipe body 14, the pipe 10 retains much of its original stiffness. This is because the protuberance sidewalls 30 extend into the two valleys 24 immediately adjacent the modified ribs 22'. This is also because the protuberance sidewalls 30 are substantially frustoconical.

Figure 5:
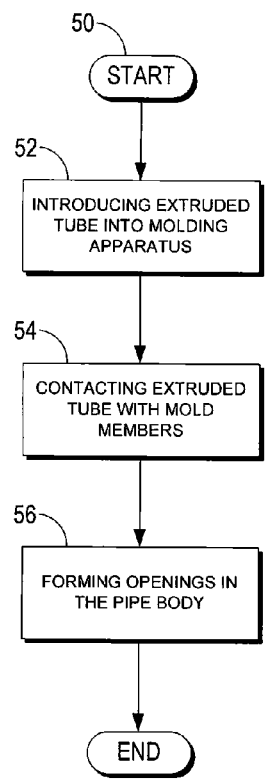
FIG. 5 is a flow diagram illustrating a method of forming openings in the body of a corrugated pipe.

Referring now to FIG. 5, a method of forming openings in a body of a corrugated pipe begins at Block 50. At Block 52 an extruded tube of resilient material is introduced into a molding apparatus having a plurality of cooperating mold members having a corrugated mold surface with protuberance forming depressions therein. At Block 54, the extruded tube is contacted with the cooperating corrugated mold members to form a corrugated pipe having an annular corrugated pipe body circumscribing a hollow conduit and including alternating annular ribs and annular valleys extending along a longitudinal axis thereof. The corrugated pipe also has a plurality of the protuberances. At Block 56, openings are formed in the pipe body by removing a radially distal end of the protuberances.

There are many different mechanisms for removing the portion of the protuberances 28 to form the holes 42. Essentially, any conventional mechanism for cutting plastic may be used, including, but not limited to, laser cutting or blade cutting.

Figure 6:
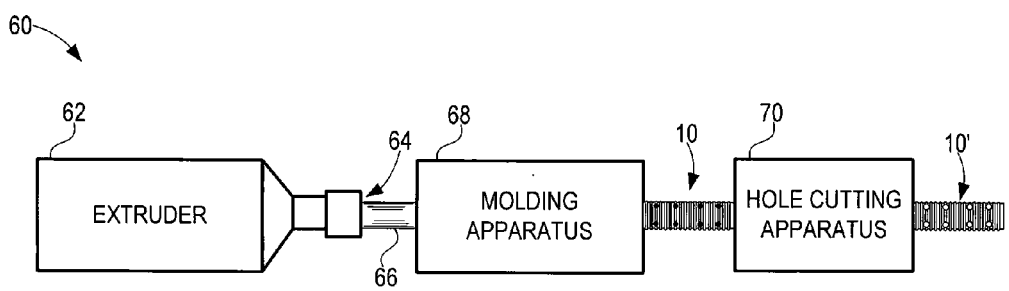
FIG. 6 is a diagram of a corrugated-pipe-making system.

A corrugated-pipe-making system 60 capable of carrying out this method and producing the previously described pipe 10' is now generally described with reference to FIGS. 6 and 7. The system 60 includes an extruder capable of extruding moldable material into tubular material 66 from an output end 64 thereof. A molding apparatus 68 receives the extruded tubular material 66 and molds it to form the corrugated pipe 10. A hole cutting apparatus 70 receives the corrugated pipe 10 and removes a radially distal portion of the protuberances 28 to form the pipe 10' with holes 42.

Figure 7:
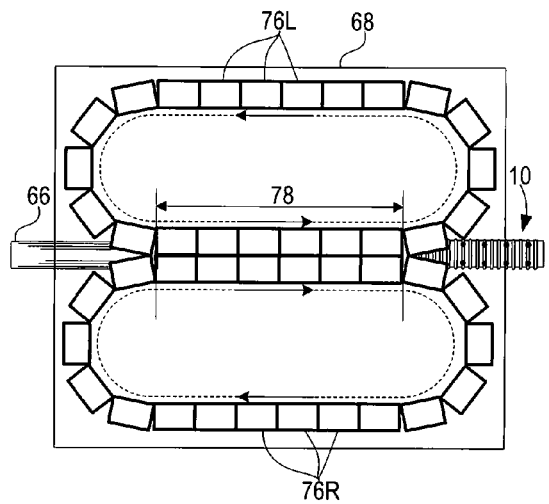
FIG. 7 is a diagram of a molding apparatus.

A molding apparatus 68 is shown in more detail in FIG. 7. The molding apparatus 68 includes a plurality of cooperating right handed 76R and left handed 76L mold members that continuously revolve in the direction shown by the arrows. Adjacent right handed mold members 76R and left handed mold members 76L are arranged end to end and move in two endless paths as shown.

The speed by which the right handed mold sections 76R and left handed mold members 76L move along their respective paths is substantially identically matched so that each pair of cooperating mold members 76R, 76L is in precise alignment and contiguous relation as they enter the molding zone 78 and move forwardly. The forward movement of the mold members 76R, 76L pulls tubular material 66 into the molding zone 78.

Figure 9:
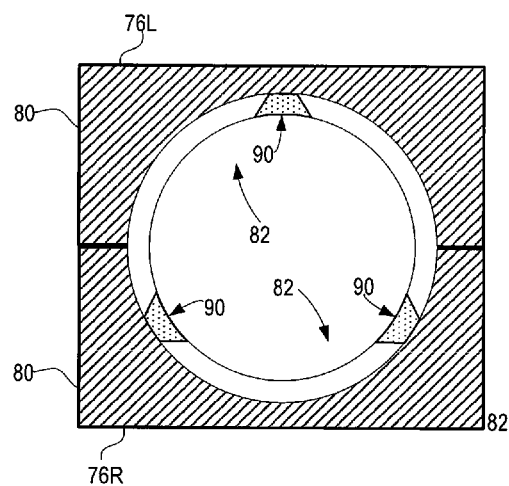
FIG. 9 is a cutaway view of the right and left mold members of FIG. 8 cooperating as if molding a pipe.

Additional details of suitable molding members 76L, 76R are shown in FIGS. 8 and 9. Each mold member 76L, 76R includes a mold body 80 and a substantially semicircular mold cavity 82. The mold cavity 82 is defined by a plurality of mold ribs 84, mold valleys 86 and modified mold valleys 88. The modified mold valleys 88 are interrupted by one or more depressions 90, which are defined by the floor of the modified mold valley 88.

During the molding process, the extruded tubular material 66 that emerges from the extruder 62 assumes the shape of the mold cavity 82. Accordingly, the depressions 90 are responsible for forming the protuberances 28.

The molding apparatus 68 may use vacuum molding, blow molding, and/or injection molding in conjunction with the mold members 76R, 76L.

Figure 10:
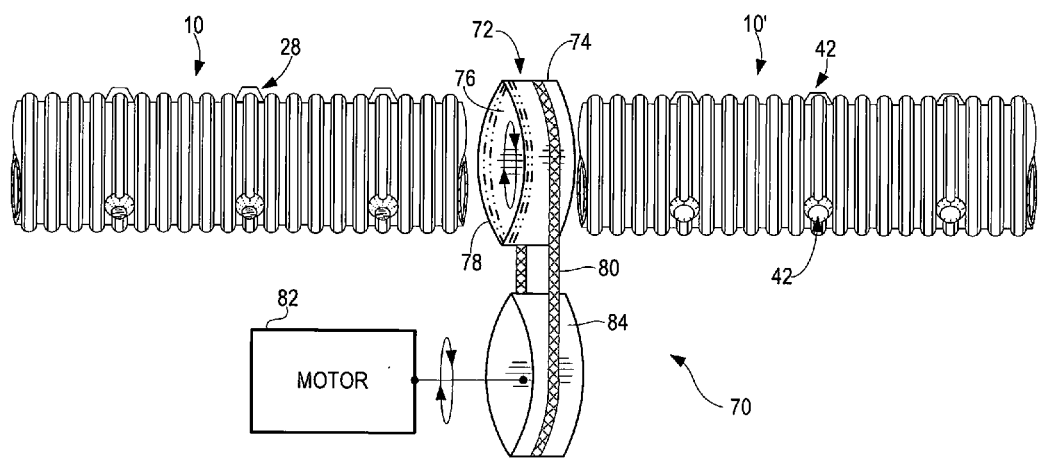
FIG. 10 is a schematic diagram of a hole cutting apparatus.

An advantageous hole cutting apparatus 70 shown in FIG. 10 is particularly useful for cutting the holes 42 because it may easily be inserted into a production line where long continuous lengths of pipe 10' are made. The hole cutting apparatus 70 includes an annular blade 72 that rotates around and axis as indicated by the arrows. The blade 72 is driven by a belt 80 that is coupled to a motor 82 by a drive wheel 84.

The blade 72 has an outer surface 74, inner surface 76, and a sharp, serrated cutting edge 78 along a forward portion of the blade 72. The diameter of the annular blade 72 is larger than the outside diameter OD of the pipe 10. This allows the pipe 10 to travel in a direction parallel to its axis A through the interior of the annular blade 72. When the protuberances 28 contact the cutting edge 78, the cutting edge 78 removes a radially distal portion of the protuberances 28 to form the holes 42. Advantageously, the removed material does not fall into the pipe 10', leaving the hollow conduit 16 clean and allowing the removed material to be recycled.

The pipe 10' is particularly useful for drainage applications. For example, the drain field systems described in U.S. Pat. Nos. 5,520,481 and 5,516,229 may be modified to include the pipe 10'. The pipe 10' may also be used as a replacement for gravel in underground water retention systems such as the underground water retention system disclosed in U.S. Pat. No. 8,240,950.

If desired, the pipe 10' may also be formed with a plurality of slits therein, as described in U.S. Pat. No. 3,831,470.

Various modifications of the embodiments described here can be made without departing from the spirit and scope of the invention as described above and as claimed.

What is claimed is:

1. A corrugated plastic pipe comprising:
   an annular corrugated pipe body made of resilient material, circumscribing a hollow conduit, and including alternating ribs and annular valleys extending along a longitudinal axis thereof;
   at least one protuberance integral with the pipe body and having a protuberance sidewall extending radially outward from a modified annular rib to an apex positioned outwardly from the modified annular rib, the protuberance sidewall extending into the valleys immediately adjacent the modified annular rib, wherein the protuberance sidewall is frustoconical and tapers inwardly.

2. A corrugated plastic pipe comprising:
   an annular corrugated pipe body made of resilient material, circumscribing a hollow conduit, and including alternating ribs and annular valleys extending along a longitudinal axis thereof;
   at least one protuberance integral with the pipe body and having a protuberance sidewall extending radially outward from a modified annular rib to an apex positioned outwardly from the modified annular rib, the protuberance sidewall extending into the valleys immediately adjacent the modified annular rib, wherein the protuberance is open at a radially distal end thereon for allowing water to enter the hollow conduit.

3. The corrugated plastic pipe of claim 2, wherein the sidewall contacts rib sidewalls of the ribs immediately adjacent the modified rib.

4. A corrugated plastic pipe comprising:
   an annular corrugated pipe body made of resilient material, circumscribing a hollow conduit, and including alternating ribs and annular valleys extending along a longitudinal axis thereof;
   at least one protuberance integral with the pipe body and having a protuberance sidewall extending radially outward from a modified annular rib to an apex positioned outwardly from the modified annular rib, the protuberance sidewall extending into the valleys immediately adjacent the modified annular rib, and wherein
   the pipe includes a plurality of the protuberances linearly spaced apart and aligned along the longitudinal axis.

5. The corrugated plastic pipe of claim 4, wherein the pipe body and the protuberances are integrally molded.

\* \* \* \* \*